US012207713B2

(12) United States Patent
Aintabi

(10) Patent No.: US 12,207,713 B2
(45) Date of Patent: Jan. 28, 2025

(54) OSCILLATING CANOPY SUNSHADE DEVICE WITH FRAME STRUCTURE FOR CLIMATE AND SOLAR MITIGATION

(71) Applicant: Vandewater Capital Holdings, LLC, New York, NY (US)

(72) Inventor: Jason Aintabi, New York, NY (US)

(73) Assignee: Vanderwater Capital Holdings, LLC, New York, NY (US)

( * ) Notice: Subject to any disclaimer, the term of this patent is extended or adjusted under 35 U.S.C. 154(b) by 222 days.

(21) Appl. No.: 17/956,341

(22) Filed: Sep. 29, 2022

(65) Prior Publication Data

US 2023/0132543 A1 May 4, 2023

Related U.S. Application Data

(63) Continuation-in-part of application No. 17/514,974, filed on Oct. 29, 2021, now Pat. No. 11,958,605.

(51) Int. Cl.
*A45B 23/00* (2006.01)
*A45B 25/14* (2006.01)

(52) U.S. Cl.
CPC ............. *A45B 23/00* (2013.01); *A45B 25/14* (2013.01); *A45B 2023/0012* (2013.01); *A45B 2200/1027* (2013.01)

(58) Field of Classification Search
CPC . A45B 23/00; A45B 25/14; A45B 2023/0012; A45B 2200/1027; A45B 2200/1009; B60L 2240/662; B60L 8/003; B60L 2240/665; B60L 50/60; E04H 15/28; E04H 15/58; B64U 2201/104; B64U 10/14; B64U 50/31; B64U 2101/00; H02S 20/23; H02S 30/20; H02S 20/30
See application file for complete search history.

(56) References Cited

U.S. PATENT DOCUMENTS

| 3,337,162 A | 8/1967 | Bauserman |
| 3,565,368 A | 2/1971 | Byron |
| D438,589 S | 3/2001 | Brown |

(Continued)

FOREIGN PATENT DOCUMENTS

| CA | 2829781 A1 | 9/2012 |
| CN | 105626375 A | 6/2016 |

(Continued)

*Primary Examiner* — Richard M Camby
(74) *Attorney, Agent, or Firm* — St. Onge Steward Johnston & Reens LLC; Stephen P. McNamara

(57) ABSTRACT

A sunshade device and sunshade management system for mitigating the effects of climate change and direct and prolonged exposure to the sun, the sunshade device including a canopy attached to a collapsible web or frame structure. The frame structure can be collapsed or opened by operation of an electric motor. The sunshade device is positioned above the ground by electrically powered lifting devices that are powered by a battery system that is charged by solar cells. A sunshade management system controls the status of the sunshade device, and can collapse the frame and activate the lifting devices to position the sunshade in the sky, and open the frame and deactivate the lifting devices to allow the sunshade device to slowly descend while providing shade to areas below the sunshade device.

15 Claims, 5 Drawing Sheets

(56) References Cited

U.S. PATENT DOCUMENTS

| | | |
|---|---|---|
| D622,896 S | 8/2010 | Bear |
| 8,857,758 B2 | 10/2014 | Al-Garni et al. |
| 9,091,462 B2 | 7/2015 | Ratti et al. |
| 9,775,305 B2 | 10/2017 | Choi |
| 10,151,120 B1 | 12/2018 | Kaneshiro |
| D847,486 S | 5/2019 | Morel |
| D852,489 S | 7/2019 | Morel |
| 10,352,063 B2 | 7/2019 | Jensen |
| 11,958,605 B2 * | 4/2024 | Aintabi ............ E04H 9/16 |
| 2004/0075411 A1 | 4/2004 | Evans |
| 2009/0283630 A1 * | 11/2009 | Al-Garni ............ A45B 23/00 |
| | | 244/33 |
| 2011/0315811 A1 | 12/2011 | Al-Garni |
| 2012/0069464 A1 | 3/2012 | Murakami |
| 2015/0240785 A1 * | 8/2015 | Chen ............ F03D 13/20 |
| | | 60/716 |

FOREIGN PATENT DOCUMENTS

| | | |
|---|---|---|
| CN | 105775097 A | 7/2016 |
| GB | 2492806 A | 1/2013 |
| WO | 2018209454 A1 | 11/2018 |

* cited by examiner

OSCILLATING CANOPY SUNSHADE DEVICE WITH FRAME STRUCTURE FOR CLIMATE AND SOLAR MITIGATION

FIELD OF THE INVENTION

The present invention relates to technology for climate change mitigation, forest fire prevention, and glacial and forest preservation. More specifically, the present invention provides a device and system to provide shade and reflect/absorb solar radiation on an adaptable and large-scale basis.

BACKGROUND OF THE INVENTION

Climate change has become a significant threat to both the natural environment and man-made structures and practices. Rising temperatures have resulted in melting of the polar ice caps and glaciers, causing rising sea levels. The melting ice caps threaten many major cities, communities, wildlife, and food sources. Higher temperatures have also resulted in increased droughts in parts of the world, impacting food production, but also leading to large accumulations of dead and dried-out plants and trees. Dry plant matter has served as fuel for large devastating fires in many parts of the world, including notably, in California and Australia.

Technologies such as green energy generation, carbon capture in fossil fuel power plants, and smart energy grid technologies are just a few examples of approaches that have been developed to combat the global climate change issue. These technologies are helpful in controlling worldwide climate change, by reducing carbon dioxide production, and thus reducing a significant driver of climate change. However, such technologies do not provide reduction of warming in particular locations.

A more localized approach for controlling climate change in specific locations is the use of sunshades and other shading technology to prevent solar heating of surface features.

Solar shades provided over surface features such as polar ice caps, glaciers, and the like, should reduce their surface temperatures and decrease their melting rate. Solar shades over open land areas such as forests, plains, and other areas subject to the risk of wild fires, should lower their ambient temperatures, allowing greater moisture retention, thereby reducing the fuel available for fires.

Previously proposed systems have never been successfully implemented in a large scale system. Small scale shades may be useful for urban and suburban environments, and some shade coverings have been used in farming. The use of large-scale, aerially suspended solar shading technology for large areas is extremely challenging due to environmental conditions, such as changing seasons, high winds, storms, and other climate-related events.

Accordingly, there remains a need for technology comprising effective materials that provides large-scale solar shading over significant size areas, capable of adapting to a changing environment and other, often unpredictable, climate events.

SUMMARY OF THE INVENTION

It is an object of the present invention to provide a large-scale sunshade device for mitigating solar warming effects in the atmosphere and providing localized shade. It is a further object of the present invention to provide a system for managing the geolocation, elevation and shape of the sunshade and adapting its use to environmental factors.

The sunshade device preferably includes a canopy fitted to a collapsible frame or web structure. The collapsible frame structure acts to shape the canopy during expansion. As an example, the frame structure may be similar to that of an umbrella with several arms extending from a central shaft with the reflective canopy extending therebetween. The frame structure may form various shapes, but will preferably form symmetric, relatively circular shapes with or without extending arms of a consistent length. In some embodiments using a frame structure, a power actuated system to open the framework, similar to an umbrella, may be provided to open the canopy to the fully open position during descent.

The canopy is formed of a lightweight, flexible material containing solar cells that generate electricity when the sunshade device is open. In other embodiments, materials such as reflective white or metallized plastic films and reflective metal foils, or fabrics such as reflective white woven and non-woven fabrics may be used.

The sunshade device is controlled by a sunshade management system. The sunshade management system controls one or more lifting devices provided in a central part of the canopy which periodically are activated to lift the sunshade device to a certain altitude, whereupon the lifting devices are deactivated or turned down to reduce lift, and the sunshade device is opened to provide a slow drifting descent, similar to a parachute, until a minimum altitude is reached, whereupon the lifting devices are activated again. The sunshade device accordingly repeatedly oscillates in elevation above the earth's surface. The oscillating sunshade device preferably closes up to reduce its area during lifting to reduce drag during periods of ascent, and opens to provide shade and air resistance during periods of descent. Preferably, the air resistance created beneath the canopy during descent operates to expand the canopy into the fully open position.

The lifting devices manage the elevation, shape and geolocation of the sunshade device as well as adapting to changing weather patterns and weather-related events. The lifting devices preferably include propellers and other features to help maintain the elevation and geolocation of the sunshade device. For example, one or more drone devices may be used as lifting devices. In the preferred embodiments, the canopy constitutes flexible solar panels having solar cells which generate electricity to operate the lifting devices, however, other solar panels may be provided in lieu of or in addition to a flexible solar panel canopy. Appropriate power storage batteries, and power management systems are provided. In one embodiment, the power storage batteries are suspended below the canopy by ropes or wires, or extending arms of the canopy, whereby the weight of the batteries assist in closing up or collapsing the canopy to reduce its area during periods of ascent, and in opening up and retaining the canopy in an open position during periods of descent.

The sunshade management system preferably employs one or more sensors to record and assess changing weather patterns and other information. The management system is also preferably in electronic communication with the one or more lifting devices. The management system's one or more sensors preferably include information on wind speed, direction, and variation, intensity of the sun's rays and angle of the sun, ambient temperature and humidity, barometric pressure, geolocation and elevation from the earth's surface, temperature and humidity at the earth's surface, precipitation status, levels, and intensity, and other maintenance related information, such as damage to the sunshade's canopy or frame, low-power or malfunctioning lifting devices, etc.

The sunshade management system may then use the information gathered by the one or more sensors and/or other data stored in or received by the management system to change the status of the sunshade device. For example, it is likely to be preferable to collapse and ground the sunshade in the evening and only launch it again after sunrise. Similarly, it is likely to be desirable to collapse and ground the sunshade during rainy days and/or cloudy days, and only launch it again when clouds have cleared. It is also very likely that it will be necessary to collapse and ground the entire device when severe weather-related events, such as thunderstorms, tornados, hurricanes, etc. are anticipated. When these weather disturbances have passed, the sunshade device may be relaunched.

The sunshade management system will therefore control the positioning of the sunshade via the lifting devices, and will hold the sunshade device substantially in place so that it can continue to perform its climate change mitigation functions when conditions are appropriate. However, the management system will be able to ground the sunshade device according to a predetermined schedule, or on an expedited basis when needed due to sudden and severe weather-related events or emergencies. After conclusion of the event or emergency, the management system can evaluate and determine whether to re-elevate the sunshade device.

Some preferable embodiments of the invention may be deployed a short or medium distance from the earth's surface, for example in the troposphere, maximizing operability to provide cover for a particular area of the earth's surface that is an area of concern. The present invention must be adapted to withstand the varying air temperature and pressure and other environmental factors depending on its deployment elevation, as those of skill in the art will recognize.

As those skilled in the art will appreciate, the present invention is not limited to the embodiments and arrangements described above. Other objects of the present invention and its particular features and advantages will become more apparent from consideration of the following drawings and detailed description of the invention.

DETAILED DESCRIPTION OF THE INVENTION

The following detailed description illustrates the technology by way of example, not by way of limitation of the principles of the invention. This description will enable one skilled in the art to make and use the technology, and describes several embodiments, adaptations, variations, alternatives and uses of the invention, including what is presently believed to be the best mode of carrying out the invention. One skilled in the art will recognize alternative variations and arrangements, and the present invention is not limited to those embodiments described hereafter.

Figure 1:
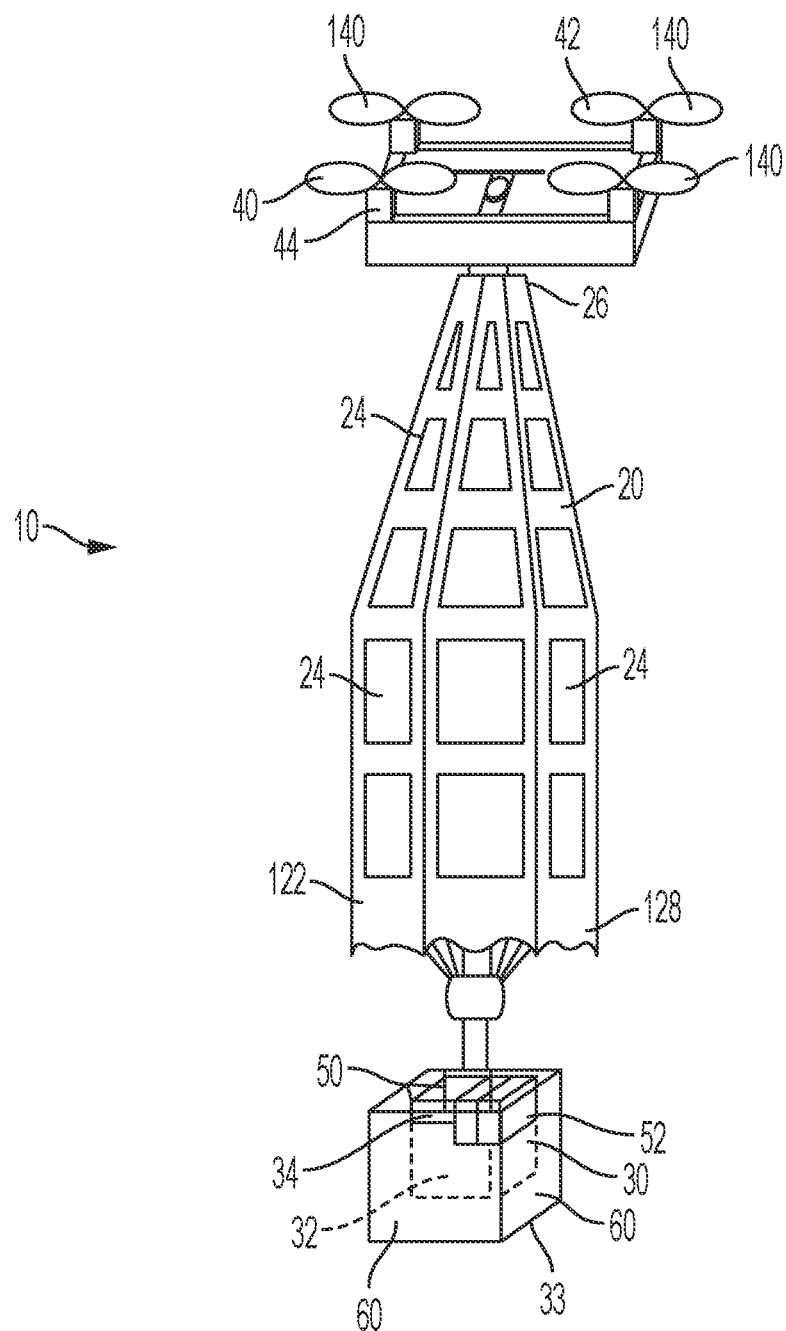
FIG. 1 is a top and side perspective view of an embodiment of a sunshade device according to the present invention in a collapsed state.
Figure 2:
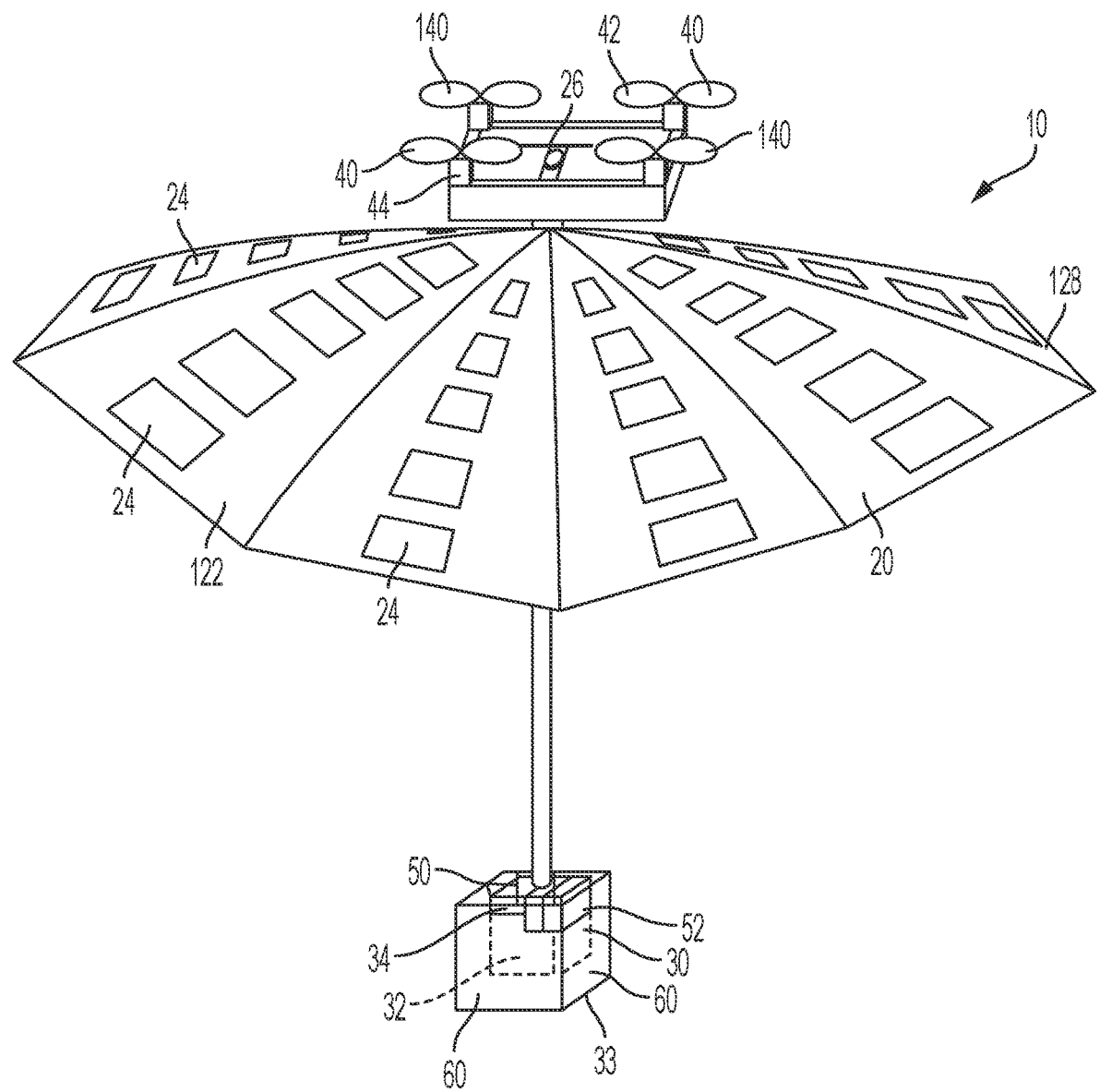
FIG. 2 is a top and perspective view of the sunshade device of FIG. 1 in an open state.
Figure 3:
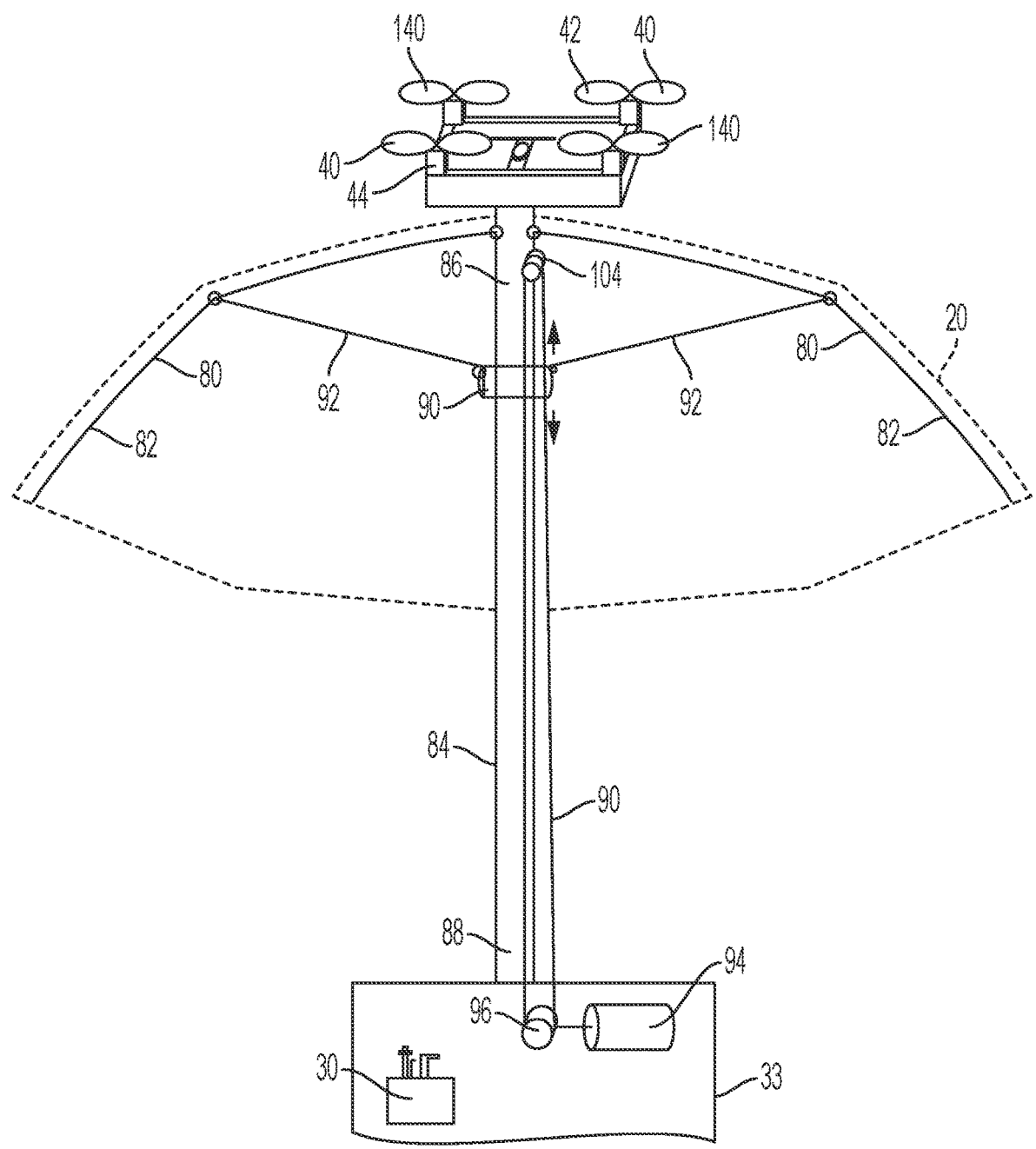
FIG. 3 is a partial cutaway side elevation view of the sunshade device of FIG. 2 in an open state
Figure 4:
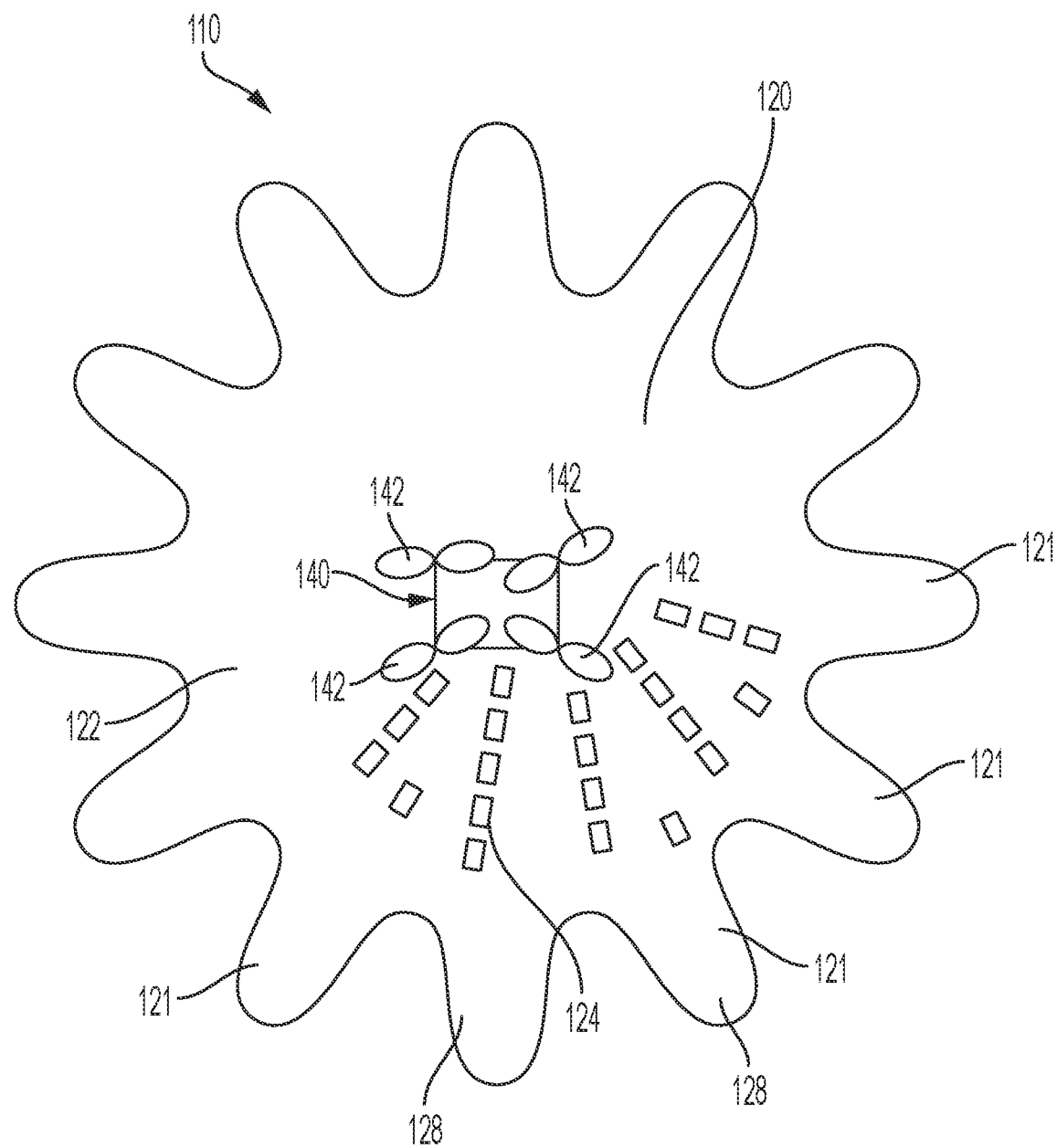
FIG. 4 is a top view of an alternative embodiment of the sunshade device of FIGS. 1-3.

Referring first to FIGS. 1-3, a sunshade device 10 is a generally circular canopy 20 having lifting devices 40 in a center portion 26 of canopy 20. In the embodiment shown in FIG. 4, a sunshade device 110 is a generally circular canopy 120 having a plurality of extending canopy arms 121.

Sunshade device 10 and 110 are used to shade a portion of landscape containing a forest or a glacier, cooling the local environment and reducing heating and drying out of forested or glaciated areas. Sunshade devices 10, 110 include, respectively, a canopy 20, 120, for providing shade from the sun, formed of a flexible lightweight sheet material. In some embodiments, canopy 20, 120 is a reflective material and may have tubular channels containing helium or other lighter than air gases to assist with maintaining the canopy's elevation. Materials such as reflective white or metallized plastic films and reflective metal foils are preferred, however, fabrics such as reflective white woven and non-woven fabrics (such as a white fabric or a white knitted material). The canopy 20, 120 may be a solid sheet material or a perforated or otherwise discontinuous sheet material. For example, the canopy may comprise a film, or a perforated film, or a non-woven or knitted white fabric. In some embodiments, canopy 20, 120 is preferably fabricated from, or coated with, a fire-retardant material. In some embodiments, canopy 20, 120 is fabricated from a combination of different materials to provide a laminated sheet having multiple materials providing multiple desired qualities or benefits.

In some embodiments of the invention, a portion or all of canopy 20, 120 is formed of a variable stiffness film material such as described in U.S. Pat. No. 10,257,929 (the disclosure of which is hereby incorporated by reference), which can become stiffer and more rigid upon the application of an electrical charge. In such case, opening of the canopy 20, 120 can be additionally initiated and maintained by providing an electrical charge to the canopy film material.

In preferred embodiments, the canopy 20, 120 is provided with a plurality of solar cells 24, 124 for receiving sunlight and converting it to electrical energy to charge the rechargeable battery power system 30 which powers the sunshade device 10, 110, and in particular its avionics and telematics systems and its electrically powered lifting devices 40, 140 described below. In particularly preferred embodiments, the canopy 20, 120 is fabricated from a flexible solar panel film 22, 122 containing embedded solar cells 24, 124.

Canopy 20, 120 has a central portion 26 and a peripheral portion 28, 128. Canopy 20, 120 is preferably symmetric in shape. In the embodiment of FIGS. 1-3, canopy 20 is generally circular in shape; in the embodiment of FIG. 4 canopy 120 has a plurality of canopy arms 121 extending radially from the central portion 126 of the canopy 120. In other embodiments, the canopy 20, 120 may be generally square, rectangular, triangular, or other polygonal shapes, or oval or semi-circular or semi-oval or other curved and partially curved shapes. In any case, the canopy 20, 120 may act as a parachute as described in more detail below.

Canopy 20, 120 is fitted to a collapsible frame structure 80, which is seen in FIG. 3. The collapsible frame structure 80 acts to shape the canopy 20, 120. Frame structure 80 may be similar to an umbrella with several arms 82 extending from a central shaft 84 with the canopy 20, 120 affixed thereto. The frame structure desirably has three or more arms 82 extending outwardly from the central shaft 84 of the frame structure, more preferably 4-6 arms 82, and, in some embodiments, 7-15 arms 82. The arms 82 may be fabricated of flexible or rigid polymeric materials or of metals. The number of arms 82 to be used will depend on the overall dimension of the sunshade device 10 and considerations of weight. The central shaft 84 is desirably a downwardly extending tubular shaft 84 having an upper end 86, and a lower end 88. The arms 82 are pivotally mounted to and extend radially outwardly from the upper end 86 of the central tubular shaft 84.

An annular slider 90 is positioned on the exterior of the tubular shaft 84. Support connectors 92 are pivotally mounted to and extend from the annular slider 90 to each of the arms 82. Downward movement of the annular slider 90 on the tubular shaft 84 from the tubular shaft upper end 86 towards the tubular shaft lower end 88 causes collapse of the frame structure 80. Upward movement of the annular slider 90 on the tubular shaft 84 from the tubular shaft lower end 88 towards the tubular shaft upper end 86 causes opening of the frame structure 80.

The frame structure 80 may form various shapes, but will preferably form symmetric, relatively circular shapes with or without extending arms of a consistent length. In some embodiments using a frame structure, a power actuated system to open the framework, similar to an umbrella, may be provided to open the canopy to the fully open position during descent.

In one embodiment of a power actuated system, an electrical motor 94 has a linkage to the annular slider 90 to provide downward movement of the annular slider 90 on the tubular shaft 84 and upward movement of the annular slider 90 on the tubular shaft 84. In a preferred embodiment, electric motor 94 is operable in two directions, and has a pulley 96 provided on a drive shaft of the electrical motor 94. A line 98 has two ends 100, 102 and the two ends are affixed to the annular slider 90., Line 98 extends through the tubular shaft 84 and around one or more pulleys 104 to the outside of the tubular shaft. The line thus forms a loop that is driven by the electrical motor 94.

A rechargeable battery power system 30 is operatively connected to the solar cells 24, 124 which charge the battery power system 30 when solar cells 24, 124 are exposed to sunlight. The battery power system includes one or more battery storage units 32 which are preferably a high capacity 12 volt (or higher) battery, sized to deliver sufficient electrical power to an electrically powered lifting device 40, 140 for a sufficient period to lift the sunshade device to a selected altitude, and retain the sunshade device at the desired altitude for a time period of at least 30, 45, 60, 90, 120, 150, or 180 minutes. In other embodiments, the battery storage units may be formed of film materials and made as part of the canopy 20, 120. The battery power system 30 is also operatively connected to and powers the electric motor 94.

Preferably, the one or more battery storage units 32 of the rechargeable battery power system 30 are contained in a container 33 suspended below the canopy 20, 120 below the canopy 20, 120 by attachment to the tubular shaft 84.

The battery power system 30 further includes a battery management system 34 to monitor the battery power and reduce power usage by components of the sunshade device 10, 110 at the direction of a sunshade management system 50 when battery power levels fall below a minimum threshold.

There is at least one electrically powered lifting device 40, 140 attached to the central portion 26, 126 of the canopy. The electrically powered lifting device 40, 140 is preferably a propeller-driven device having rotors or propellers 42, 142. Lifting device 40, 140 may have a single propeller or rotor, or multiple propellers or rotors. In the embodiments shown in the Figures, four rotors 42, 142 are shown (e.g. a quadcopter drone embodiment) but anywhere from one to twenty rotors may be used. The number and size of each rotor 42, 142 may be selected depending on the size of the sunshade device 10, 110 and its weight to be lifted. The preferred embodiment is expected to be a single quadcopter arrangement, however, potentially 1, 2, or 4 quadcopter arrays could be used.

The rotors 42, 142 are driven by appropriately sized electrical motors 44. The at least one lifting device 40, 140 is operatively connected to the rechargeable battery power system 30 to drive the electrical motors 44 when directed by the sunshade management system 50.

Appropriate aircraft warning lights are provided on the lifting device 40 and the peripheral portion 28 of canopy 20, 120, and potentially, elsewhere on the canopy 20, 120 and on the container 33. Typical blinking red lights may be used to provide visibility to the sunshade device 10, 110, both when it is airborne and grounded.

Quadcopter (also known as quadrotor) drone technology is very well developed at this time, and in one preferred embodiment, the lifting device 40, 140 and parts of the control systems of the sunshade management system 50 are implementations of known quadcopter concepts. Quadcopters generally have four rotors, two rotors spinning clockwise and two counterclockwise. The four rotors provide opposing torques, and can be individually manipulated to steer the quadcopter.

There are four primary movements that a quadcopter employs and they are controlled by each of the four rotors. In a typical layout, rotors 1 and 4 rotate clockwise, while rotors 2 and 3 rotate counterclockwise. Yaw is the clockwise or counterclockwise spin of a quadcopter. Yaw is used to rotate left, by operating rotors 1 and 4 propellers at normal speed, and rotors 2 and 3 at high speed. To rotate right, rotors 1 and 4 move at high speed and rotors 2 and 3 move at normal speed. Pitch is used to control the forward and backward movement of a quadcopter. To move forward, rotors 1 and 2 move at normal speed, while rotor 3 and 4 move at high speed. To move backward, rotors 1 and 2 run at high speed while rotors 3 and 4 run at normal speed. Roll is used to cause the quadcopter to bend left or bend right. In order to roll to the left, rotors 1 and 3 run at normal speed while rotors 2 and 4 run at high speed. To roll to the right, rotors 1 and 3 run at high speed and rotors 2 and 4 run at normal speed. Vertical positioning, e.g. ascent and descent are caused, respectively, by operating all rotors at high speed, and by operating all rotors at slower speeds.

Figure 5:
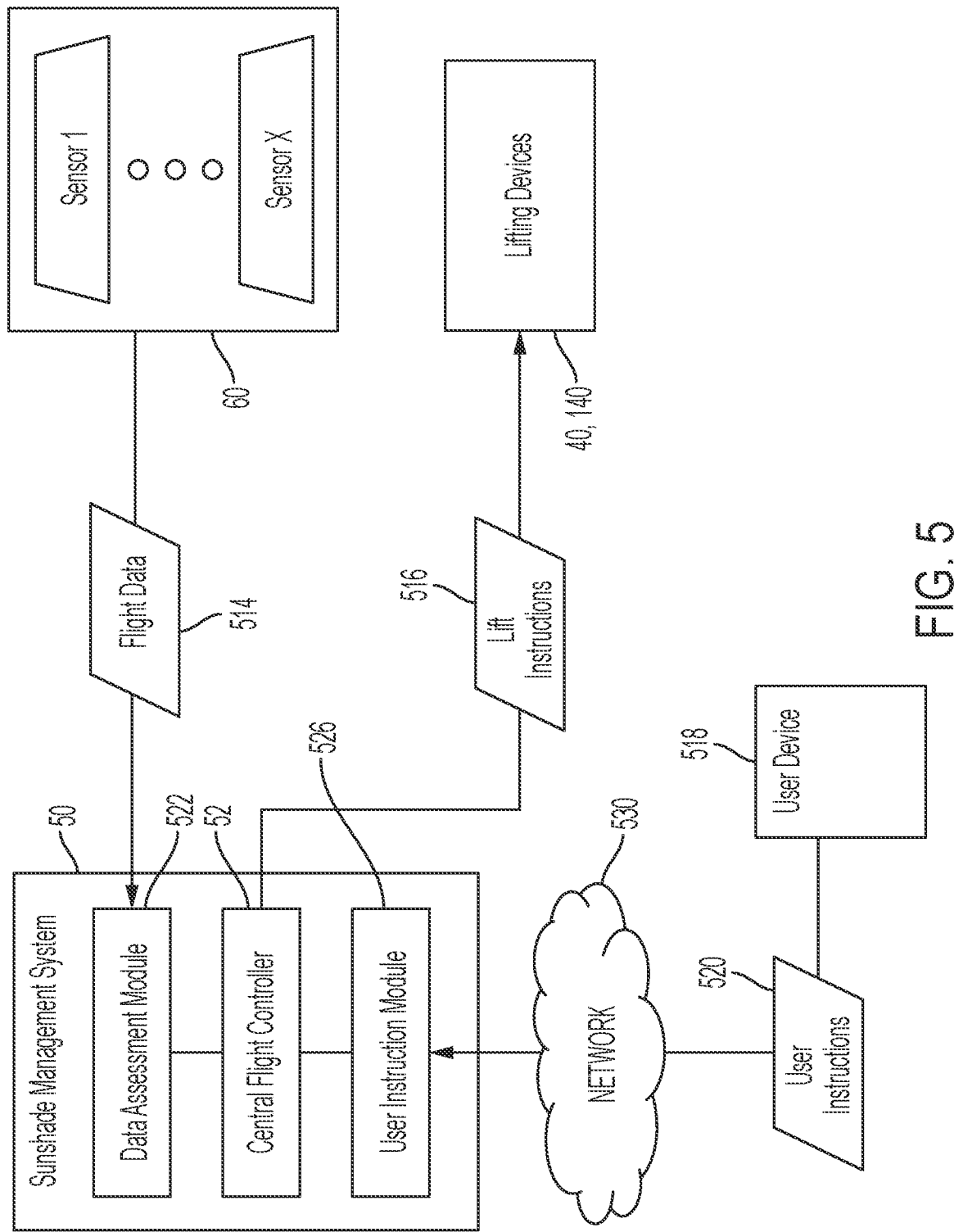
FIG. 5 is a schematic representation of an exemplary sunshade management system according to the principals and embodiments of the present invention depicted in FIGS. 1-4.

FIG. 5 depicts a schematic representation of the sunshade management system 50. Preferable embodiments of the sunshade management system 50 interpret flight data 514 provided by one or more sensors 60 to determine the best positioning for the canopy 20, 120. The one or more sensors 60 may be associated with the container 33 or they may be distributed at various locations on the canopy 20, 120 and lifting devices 40, 140. Additional sensors may be provided at or near the earth's surface.

Sunshade management system 50 controls the elevation and angle (pitch) and geolocation (latitude and longitude) positioning of the sunshade device 10, 110 based on flight data 514 provided by one or more sensors 60. Sunshade management system 50 controls the one or more lifting devices 40, 140 to activate them to lift the sunshade device 10, 110 and/or to deactivate or reduce activity of the lifting devices 40, 140 to cause the sunshade device 10, 110 to descend.

During lifting of the sunshade device 10, 110, the canopy 20, 120 is collapsed as seen in FIG. 1. The sunshade management system 50 controls electric motor 94, whereby the sunshade management system 50 operates the electric motor 94 to move the annular slider 90 downwardly on the tubular shaft 84 to collapse the frame structure 80 and associated canopy 20, 120 during lifting of the sunshade device 10, 110. Collapse of canopy 20, 120 may also be assisted by air pressure on the upper surface of the canopy 20, 120 during lifting of the sunshade device 10, 110.

During descent of the sunshade device 10, 110, the canopy 20, 120 is opened as seen in FIG. 2. The sunshade management system 50 controls electric motor 94 and causes it to move the annular slider 90 upwardly on the tubular shaft 84 to open the frame structure 80 and open canopy 20, 120. Opening of canopy 20, 120 may also be assisted by air pressure on a lower surface of the canopy 20, 120 during descent of canopy 20, 120.

When open, the canopy 20, 120 acts as a parachute to support and slow the descent of the sunshade device 10, 110 and to provide shade to locations below sunshade device 10, 110.

Preferably, the sunshade management system 50 is provided with one or more sensors 60 for sensing one or more of the sunshade's altitude, elevation from the earth's surface, air temperature, barometer pressure, humidity, wind speed and direction, GPS signals, solar intensity, solar angle. Data obtained by the sensors allow the sunshade management system 50 to make determinations as to activation and deactivation of the lifting devices 40, 140.

Desirably, the sunshade management system 50 is provided with artificial intelligence and machine learning whereby it is able to make determinations regarding appropriate timing of takeoff and shutdown, and positioning of the elevation and angle of canopy 20, 120 relative to the ground below, to maximize the shade effects of canopy 20, 120.

Sunshade management system 50 activates the lifting devices 40, 140 to lift the sunshade device 10, 110 when a sunshade device altitude measurement is equal to or below a preselected minimum altitude setting. Sunshade management system 50 deactivates or reduces activity of the lifting devices 40, 140 to allow descent of the sunshade device 10, 110 when a sunshade device altitude measurement is equal to or greater than a preselected maximum altitude setting.

In typical embodiments, sunshade management system 50 incorporates a central flight controller module 52 similar to a drone system. The central flight controller includes an Inertial Measurement Unit (IMU), a gyroscope, and satellite positioning (GPS and GLONASS). An accelerometer may be provided to determine orientation relative to the earth's surface. Obstacle detection sensors may be included. The central flight controller receives data from IMU, Gyroscope, GPS modules, accelerometer, and obstacle detection sensors, and using programmed flight parameters and algorithms it calculates speed settings for each rotor, and sends control signals to electronic speed controllers (ESC) associated with each motor.

The central flight controller module 52 may have additional features such as intelligent orientation control (IOC); signal to the motor ESCs on thrust and direction; intelligent landing gear; auto return to home; multi rotor fail protection; highly sensitive built-in damper IMU module; satellite receiver; and banked turn mode.

Preferable embodiments of the sunshade management system 50 are thus in electronic communication with the lifting devices 40, either by wire connection or over a wireless connection. Accordingly, the sunshade management system 50 is capable of: controlling the state of collapse or opening of the canopy 20, 120; controlling the elevation and geolocation positioning of the sunshade device 10, 110; and determining if grounding of the sunshade device 10, 110 is necessary due to one or more of weather, safety, and battery power of the sunshade device 10, 110. The sunshade management system 50 preferably performs each of these functions on a continuous, real-time basis and preferably learns from past assessments and instructions to improve its performance over time.

The sensors 60 preferably collect and transmit relevant flight data 514 such as altitude and elevation from the earth's surface, geolocation, GPS signal strength/presence, air temperature, humidity, precipitation, barometric pressure, wind speed and direction, solar intensity and angle, temperature and moisture levels at the earth's surface, and ambient precipitation.

Preferable embodiments of the sensors 60 and sunshade management system 50 also detect and transmit maintenance related data and information, such as damage to the sunshade's canopy 20, 120, low-power or malfunctioning lifting devices 40, 140, etc.

The sunshade management system 50 then uses the data and information collected by and transmitted from the sensors 60 to make real-time determinations about the positioning and effectiveness of the sunshade device 10, 110.

The sunshade management system 50 preferably employs a data assessment module 522 to obtain the flight data 514 and related information from the sensors 60, perform an analysis of the present environment and anticipated future environment based upon the flight data 514, and determine the optimal course of activities for the sunshade device 10, 110. The data assessment module 522 preferably performs these functions on a continuous and real-time basis such that the sunshade management system 50 is constantly reconsidering the optimal placement, shape, etc. for the sunshade device 10.

Using the flight data 514 received from the sensors 60, the data assessment module 522 causes the central flight controller 52 to generate lift instructions 516 and transmit those instructions to the lifting devices 40, 140. The lift instructions 516 can alter the angle or elevation of the sunshade device 10, 110 can reduce the footprint of or ground the sunshade device 10, 110 or re-position or otherwise alter the sunshade device 10, 110. The lift instructions 516 are preferably executed by the lifting devices 40, 140 in real-time such that data is recorded and transmitted by the sensors 60 and analyzed and interpreted by the sunshade management system 50 to generate lift instructions 516, and those lift instructions 516 are then executed by the lifting devices 40, 140 all immediately, continuously, and in real-time.

Thus, for example, the sunshade management system 50 may have the ability to determine when ambient conditions of temperature, sunlight, and humidity are appropriate and sufficient to activate the sunshade device 10, 110 into a flight mode, and similarly, if ambient conditions of temperature, sunlight, and humidity are appropriate and sufficient to discontinue operation of the sunshade device 10, 110 and ground it for the night. In other situations, grounding of the sunshade device 10, 110 is necessary due to one or more of weather, safety, and battery power of the sunshade device 10, 110. In one embodiment, the sunshade device management device 50 has means for receiving weather forecast data and, based on the weather forecast data, controlling the elevation and geolocation positioning, and grounding of the sunshade device In the case of extreme weather events, the sunshade management system 50 may determine that the sunshade 10, 110 should be folded up, grounded, or otherwise protected until the severe weather event ends. In the event of present or imminent severe weather, the sunshade management system 50 preferably acts to protect and preserve the sunshade device 10, 110 by taking appropriate action. Such actions may include collapsing the sunshade device 10, 110 but maintaining its elevation, grounding the sunshade device, or a combination. Such actions may also include moving the sunshade device 10, 110 or increasing or reducing its elevation to avoid the severe weather.

In some preferable embodiments, user input may further be provided over a network. User input may, for example, instruct the sunshade management system 50 to generate lift instructions 516 to form ground the sunshade device 10 for maintenance. The user instructions 520 may be used to improve the efficacy of the sunshade device 10, 110 or for other, non-functional reasons, such as to form a shape in celebration of or as a memorial to a certain event or holiday. Some preferable embodiments of the sunshade device 10, 110 may also display certain messages, colors, patterns, etc. on the underside of the canopy. In such embodiments, the sunshade management system 50 may alter such underside display on the basis of user input.

Some preferable embodiments of the sunshade management system 50 employ a user instruction module 526 to obtain, parse, and communicate the user instructions 520 with the other components of the sunshade management system 50. Such embodiments provide for fluid and optimized functionality of the sunshade management system 50 by compartmentalizing the data analysis and instruction generation functions of the sunshade management system 50.

As previously mentioned, in some preferable embodiments, the sunshade management system 50 is capable of implementing machine learning algorithms to optimize its performance. For example, upon receipt of flight data 514 indicating the presence of extreme weather, the data assessment module 522 may determine a particular course of action that results in a suboptimal result. The data assessment module 522, in such preferable embodiments, is capable of determining that its determination of an optimal course of action was incorrect or was delayed, and will therefore react differently in the future upon receipt of the same flight data 514 indicating the presence of extreme weather. In this way, the sunshade management system 50 performance can be improved the longer the sunshade device 10, 110 remains deployed and the sunshade management system 50 remains active.

Furthermore, in some embodiments, there may be a plurality of sunshade devices 10, 110 in communication with each other to coordinate their actions, for example, one sunshade devices 10, 110 may be descending while a different one is ascending, to thereby optimize positioning and continuity of shade case by the sunshade devices 10, 110. A swarm of autonomously controlled networked sunshade devices 10, 110 can thereby operate independently in remote locations without requiring continuous direct control, which may require on-site or satellite control systems.

The present invention provides a sunshade device 10, 110 which has little to no energy footprint, and which can be strategically deployed to mitigate the harmful effects of climate change over large portions of the earth's surface. Those of ordinary skill in the art will recognize the efficacy of the embodiments described herein for accomplishing the present invention's objectives. While the invention has been described with reference to particular embodiments and arrangements of parts, features, and the like, it is not limited to these embodiments or arrangements. Indeed, modifications and variations included in these teachings will be ascertainable to those of skill in the art.

What is claimed is:

1. A sunshade device, comprising:
   a canopy for providing shade from the sun formed of a flexible lightweight sheet material;
   a collapsible frame structure, the canopy being affixed to the frame structure, wherein the frame structure has a downwardly extending central tubular shaft having an upper end, and a lower end and an exterior, with an annular slider positioned on the exterior of the tubular shaft, the frame structure having three or more arms pivotally mounted to and extending outwardly from the central tubular shaft, and a support connector pivotally mounted to and extending from the annular slider to each of the three or more arms; whereby downward movement of the annular slider on the tubular shaft from the tubular shaft upper end towards the tubular shaft lower end causes collapse of the frame structure; whereby upward movement of the annular slider on the tubular shaft from the tubular shaft lower end towards the tubular shaft upper end causes opening of the frame structure;
   at least one electrically powered lifting device attached to the frame structure or canopy;
   a rechargeable battery power system operatively connected to the at least one lifting device;
   solar cells provided on the canopy, said solar cells being operatively connected to the battery power system to charge the battery power system;
   a sunshade management system controlling the one or more lifting devices and the frame structure;
   the sunshade management system controlling the frame structure to collapse the frame structure and activate the lifting devices to lift the sunshade device;
   the sunshade management system controlling the frame structure to open the frame structure and deactivate or reduce activity of the lifting devices to allow descent of the sunshade device.

2. The sunshade device of claim 1, wherein the frame structure is collapsed during lifting of the sunshade device, thereby reducing drag on the canopy during lifting of the sunshade device.

3. The sunshade device of claim 1, wherein the frame structure is opened during descent of the sunshade device, the canopy thereby providing shade and increased air resistance during periods of descent.

4. The sunshade device of claim 1, further comprising
   an electrical motor operatively connected to the battery power system, with a linkage to the annular slider to provide downward movement of the annular slider on the tubular shaft and upward movement of the annular slider on the tubular shaft.

5. The sunshade device of claim 4, wherein said electric motor is operable in two directions and said linkage comprises a line having two ends, the two ends being engaged to the annular slider, the line extending through the tubular shaft and around pulleys to the outside of the tubular shaft to form a loop, the line being engaged with a pulley provided on a drive shaft of the electrical motor.

6. The sunshade device of claim 5, wherein said electric motor is operably connected to and controlled by the sunshade management system, whereby the sunshade management system operates the electric motor to move the annular slider downwardly on the tubular shaft to collapse the frame structure, and the sunshade management system operates the electric motor to move the annular slider upwardly on the tubular shaft to open the frame structure.

7. The sunshade device of claim 6, wherein one or more battery storage units of the rechargeable battery power system are located below the tubular shaft.

8. The sunshade device of claim 6, wherein the at least one lifting device comprises a propeller-driven device.

9. A sunshade device, comprising:
a canopy for providing shade from the sun formed of a flexible lightweight sheet material;
a collapsible frame structure, the frame structure having a downwardly extending central tubular shaft having an exterior having an upper end, and a lower end;
an annular slider positioned on the exterior of the tubular shaft,
the frame structure having three or more arms pivotally mounted to and extending outwardly the central tubular shaft, and a support connector pivotally mounted to and extending from the annular slider to each of the three or more arms, whereby downward movement of the annular slider on the tubular shaft from the tubular shaft upper end toward the tubular shaft lower end causes collapse of the frame structure, and whereby upward movement of the annular slider on the tubular shaft from the tubular shaft lower end toward the tubular shaft upper end causes opening of the frame structure;
the canopy being affixed to the frame structure;
an electrical motor with a linkage to the annular slider to provide downward movement of the annular slider on the tubular shaft and upward movement of the annular slider on the tubular shaft,
at least one electrically powered lifting device attached to the frame structure or canopy;
a rechargeable battery power system operatively connected to the at least one lifting device and the electric motor;
solar cells provided on the canopy, said solar cells being operatively connected to the battery power system to charge the battery power system;
a sunshade management system controlling the one or more lifting devices and the electric motor;
the sunshade management system controlling the electric motor to collapse the frame structure and activate the lifting devices to lift the sunshade device;
the sunshade management system controlling the electric motor to open the frame structure and deactivate or reduce activity of the lifting devices to allow descent of the sunshade device.

10. The sunshade device of claim 9, wherein said electric motor is operable in two directions and said linkage comprises a line having two ends, the two ends being engaged to the annular slider, the line extending through the tubular shaft and around pulleys to the outside of the tubular shaft to form a loop, the line being engaged with a pulley provided on a drive shaft of the electrical motor.

11. The sunshade device of claim 10, whereby the sunshade management system operates the electric motor to move the annular slider downwardly on the tubular shaft to collapse the frame structure, and the sunshade management system operates the electric motor to move the annular slider upwardly on the tubular shaft to open the frame structure.

12. The sunshade device of claim 11, wherein the frame structure is collapsed during lifting of the sunshade device, thereby reducing drag on the canopy during lifting of the sunshade device.

13. The sunshade device of claim 11, wherein the frame structure is opened during descent of the sunshade device, the canopy thereby providing shade and increased air resistance during periods of descent.

14. The sunshade device of claim 9, wherein one or more battery storage units of the rechargeable battery power system are located below the tubular shaft.

15. The sunshade device of claim 9, wherein the at least one lifting device comprises a propeller-driven device.

* * * * *